United States Patent [19]

Mori

[11] Patent Number: 4,917,324
[45] Date of Patent: Apr. 17, 1990

[54] WEBBING RETRACTOR

[75] Inventor: Shinji Mori, Aichi, Japan

[73] Assignee: Kabushiki Kaisha Tokai-Rika-Denki-Seisakusho, Aichi, Japan

[21] Appl. No.: 265,823

[22] Filed: Nov. 1, 1988

[30] Foreign Application Priority Data

Nov. 6, 1987 [JP] Japan .................. 62-169897

[51] Int. Cl.$^4$ ............................................. B60R 22/44
[52] U.S. Cl. .................................................. 242/107
[58] Field of Search ................... 242/107, 107.4 R; 280/807; 297/475

[56] References Cited

U.S. PATENT DOCUMENTS

| 4,126,282 | 11/1978 | Morita et al. | 242/107 |
| 4,165,844 | 8/1979 | Tanaka | 242/107 |
| 4,212,435 | 7/1980 | Kawaharazaki | 242/107 |
| 4,345,723 | 8/1982 | Morinaga | 242/107 |
| 4,383,658 | 5/1983 | Morita et al. | 242/107 |

FOREIGN PATENT DOCUMENTS

| 2544476 | 3/1977 | Fed. Rep. of Germany . |
| 3603670 | 8/1987 | Fed. Rep. of Germany . |
| 2357266 | 2/1978 | France . |
| 2478471 | 9/1981 | France . |
| 60-44856 | 3/1985 | Japan . |
| 2016261 | 9/1979 | United Kingdom . |

Primary Examiner—John M. Jillions
Attorney, Agent, or Firm—Oliff & Berridge

[57] ABSTRACT

A webbing retractor in which a retracting shaft for winding up a webbing is urged by a pair of resilient members connected in series through a ratchet wheel to cause the webbing to be wound around the retracting shaft, and a pawl is disengageably meshed with the ratchet wheel by a friction spring which is transmitted a rotation of the retracting shaft through a frictional force so that an urging force of one of the resilient members is prevented from transmitting to the retracting shaft during engagement of the pawl with the ratchet wheel, wherein a reduced condition of the webbing retracting force is able to be maintained over a wide range.

20 Claims, 12 Drawing Sheets

WEBBING RETRACTOR

BACKGROUND OF THE INVENTION

1. Field of the Invention

This invention relates to a webbing retractor of a seatbelt device in a vehicle for reducing a winding urging force of the restraining webbing on an occupant.

2. Description of the Related Art

In a seatbelt device for a vehicle, a webbing retractor for decreasing a winding force is used, the retractor of which has a pair of resilient members provided in series for applying a webbing retracting urging force to a winding shaft. A connecting portion between the resilient members can be locked so that the urging force of one of the resilient members is not transmitted to an occupant while the seatbelt device is being worn.

As disclosed in the Japanese Utility Model Application Laid Open No. 60-44856, as an example, a retractor device is constructed such that each end of a pair of resilient members connected in series is engaged with a ratchet wheel, and when a webbing is applied to an occupant, a pawl is engaged with the ratchet wheel so that a winding urging force of one of the resilient members is not transmitted to a winding shaft.

In this type of webbing retractor, when the winding shaft is rotated in a webbing winding direction after the occupant releases the webbing, the rotating force is transmitted to a cam plate and the cam plate forcedly releases a pawl from the ratchet wheel, the winding force of both resilient members is transmitted to the winding shaft and a positive winding force is generated. Due to this arrangement, when the rotation of a connecting wheel in a webbing winding direction is transmitted to the cam plate, the full winding force is released by a slight winding operation even though the occupant is still in the seatbelt device. However, since a more certain amount of pulling-out or winding operation is performed, by the wearer it is desirable that the full winding force is not released.

The conventional type of cam plate is constructed such that projections fit into a ring-shaped groove of the connecting wheel which rotates together with the winding shaft when the webbing is to be wound, the cam plate may start to rotate after its maximum one rotation in reference to its relative position with respect to the connection wheel and in addition when the connection wheel is rotated in its maximum one rotation, the cam plate may forcedly move the pawl away from the ratchet wheel.

SUMMARY OF THE INVENTION

In view of the above-described circumstances, it is an object of the present invention to provide a webbing retractor in which a reduced condition of the webbing winding force can be maintained over an elongated range when the webbing is rotated in its winding direction from the state where the webbing retracting force is reduced.

The present invention provides a webbing retractor of a seatbelt device which is characterized by a construction disclosed hereunder. The webbing retractor is comprised of a frame; a winding shaft pivotally supported by the frame to wind up an occupant restraining webbing; a connection wheel connected to the winding shaft; a first resilient member, one end of which is engaged with the connection wheel; a ratchet wheel to which the other end of the first resilient member is engaged; a second resilient member, one end of which is engaged with the ratchet wheel and the other end of which is engaged with the frame; a pawl engaged with the ratchet wheel to prevent an urging force of the second resilient member from being added to the winding shaft; a friction rotating means being rotatable to a desired angle by transmittance of a rotation of the winding shaft through a frictional force so that the pawl can be engaged with the ratchet wheel under an intermediate condition of the rotation; a cam apparatus receiving a rotational force of the connection wheel and rotated to cause the pawl to be moved away from the ratchet wheel when rotated in a winding direction of the webbing; and a cam driving apparatus in which a groove receiving a projection projected from the cam apparatus is formed helically at an outer circumference of the connection wheel and the projection may transmit a rotation of the connection wheel to the cam apparatus while the projection corresponds to a longitudinal end of the groove.

In the present invention, even though the winding shaft is rotated in a webbing winding direction from a state where the webbing winding force is reduced, the projection of the cam apparatus is guided by the helical groove at the outer circumference of the connection wheel and so the cam apparatus is loosely rotated with the connection wheel. After the connection wheel, that is, the winding shaft is rotated several times in a webbing winding direction, the projection of the cam apparatus corresponds to the longitudinal end part of the helical groove, and the cam apparatus is rotated together with the connection wheel to cause the pawl to be moved away from the ratchet wheel. With this arrangement, only after the winding shaft is rotated several times in the webbing winding direction from the state where the winding force is reduced, is the full winding force released so that the winding force reduced condition is not needlessly released under a normal action of the occupant driving of the vehicle.

The above and other objects, features and advantages of the present invention will become more apparent from the following description of the preferred embodiments thereof, taken in conjunction with the accompanying drawings.

BRIEF DESCRIPTION OF THE DRAWINGS

FIGS. 11 to 13 illustrate a second embodiment of a webbing retractor to which the present invention is applied, where

DESCRIPTION OF THE PREFERRED EMBODIMENTS

Figure 1:
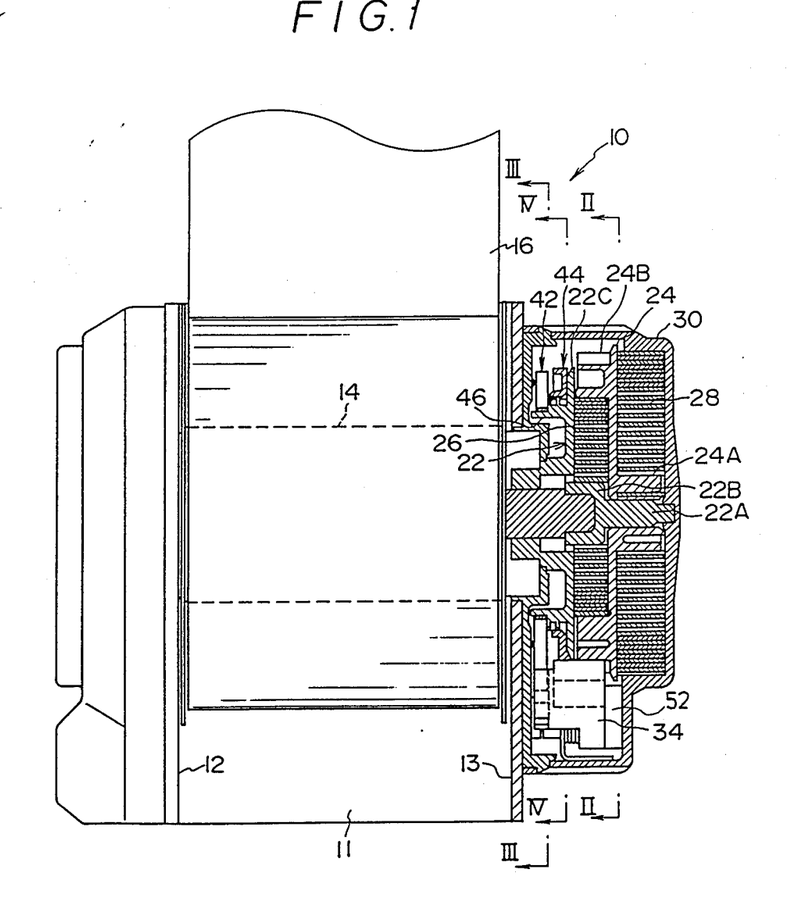
FIG. 1 is a sectional view of a first embodiment of a webbing retractor which to the present invention is applied.

In FIG. 1 is illustrated a sectional view of a webbing retractor 10 of a first embodiment of the present invention. The webbing retractor 10 is constructed such that a frame 11 is fixed to a chassis by bolts not shown and a retracting shaft 14 is pivotally supported at leg plates 12 and 13 extending from both sides of the frame 11.

To the retracting shaft 14 is engaged one end of an occupant restraining webbing 16 and the webbing is wound in a layer form.

To the other end of the webbing 16 is fixed a tongue plate (not shown) which is engaged with a buckle device vertically installed at an opposite side of a seat (not shown), thereby the occupant may wear an intermediate part of the webbing 16.

A connection wheel 22 is coaxially fixed to the retracting shaft 14 and rotates together with the retracting shaft 14. The connection wheel 22 has a ratchet wheel 24 rotatably supported at a reduced diameter portion 22A projecting axially.

An outer end of a small spiral spring is engaged to an inner circumferential surface of the ratchet wheel 24 and an inner end of the small spiral spring 26 is engaged with a spring engaging part 22B adjacent to the reduced diameter portion 22A.

To a projected portion 24A of the ratchet wheel 24 is engaged an inner end of a large spiral spring 28 acting as a second resilient member. The large spiral spring 28 has a larger urging force than that of the small spiral spring 26, and its outer end is engaged with a cover 30 fixed to the leg part 13 and the spiral spring 28 is supported by the frame 11 through the cover 30.

Figure 2:
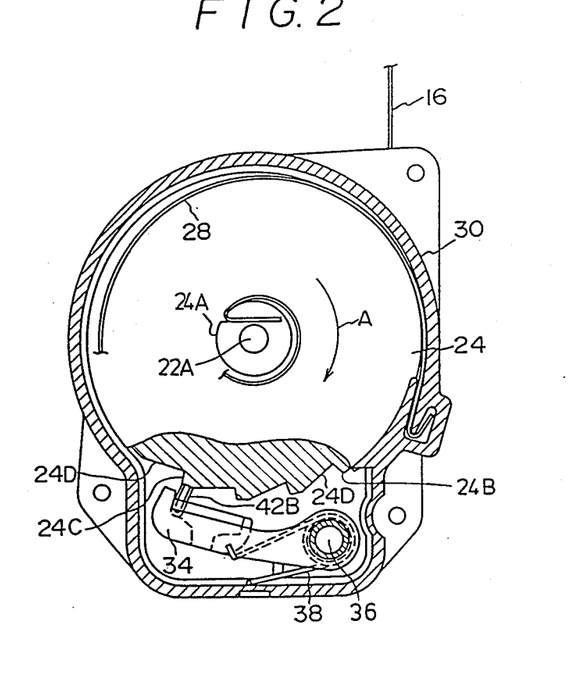
FIG. 2 is a sectional view taken along a line II—II of FIG. 1.

Thus, the retracting shaft 14 is constructed such that it may receive an urging force of the small spiral spring 26 and the large spiral spring 28 connected in series through the ratchet wheel 24 so that it may be rotated in a winding direction of the webbing 16 (a direction of an arrow head A in FIG. 2).

Figure 10:
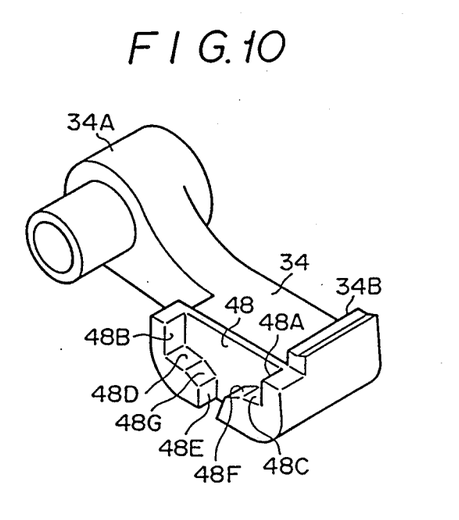
FIG. 10 is a perspective view showing a pawl.

As shown in FIG. 2, a pawl 34 corresponds with an outer circumference of the ratchet teeth 24B of the ratchet wheel 24. As shown in FIG. 10, this pawl 34 has a projected portion 34A pivotally supported by a shaft 36 projecting from the cover 30. When a projection 34B projecting from the extremity end is engaged with the ratchet teeth 24B, it prevents the ratchet 24 from being rotated in a webbing retracting direction (a clockwise direction in FIGS. 5 and 6, a direction of the arrow head A) and further prevents an urging force of the large spiral spring 28 from being transmitted to the retracting shaft 14, so that only a weak urging force of the small spiral spring 26 is transmitted. Due to this arrangement, a twisted coil spring 38 fixed to an outer circumference of the projecting portion 34A has both ends bridged between the cover 30 and the pawl 34 and generates an urging force in such a direction that the projection 34B of the pawl 34 to be engaged with the ratchet teeth 24B.

In order to control the conditions under which the pawl 34 and the connection wheel 22 are engaged or released a friction spring 42 acting as a frictional rotating apparatus and a cam plate 44 acting as a cam apparatus are provided.

Figure 3:
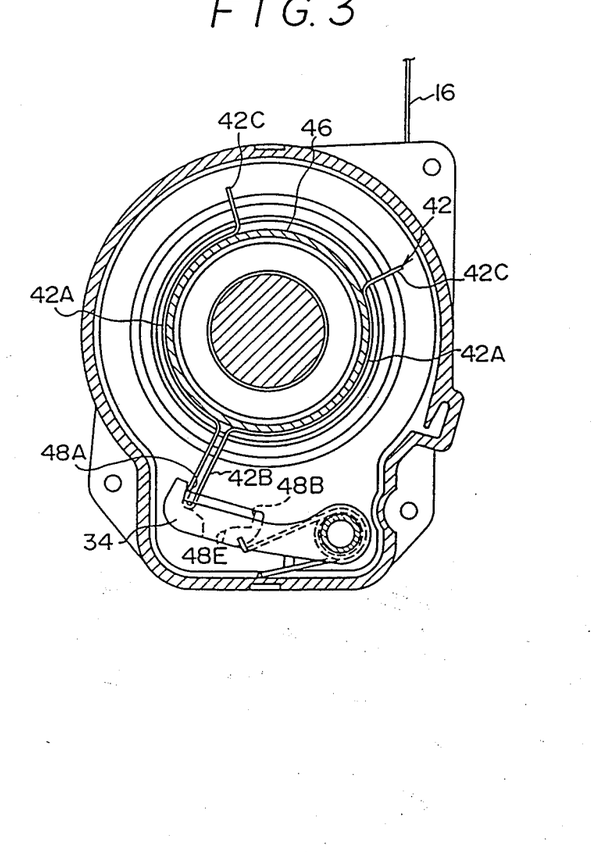
FIG. 3 is a sectional view taken along a line III—III of FIG. 1.

As shown in FIG. 3, the friction spring 42 is constructed such that a pair of intermediate portions 42A contact the outer circumference of a cylindrical portion 46 of the connection wheel 22 to receive the rotation of the connection wheel 22 through a frictional force. A substantially U-shaped arm 42B is projected from one end of the intermediate portion 42A and corresponds with the pawl 34. The arm 42B is inserted into a groove or a concave portion 48 formed near the extremity end of the pawl 34 (see FIG. 10).

Figure 5:
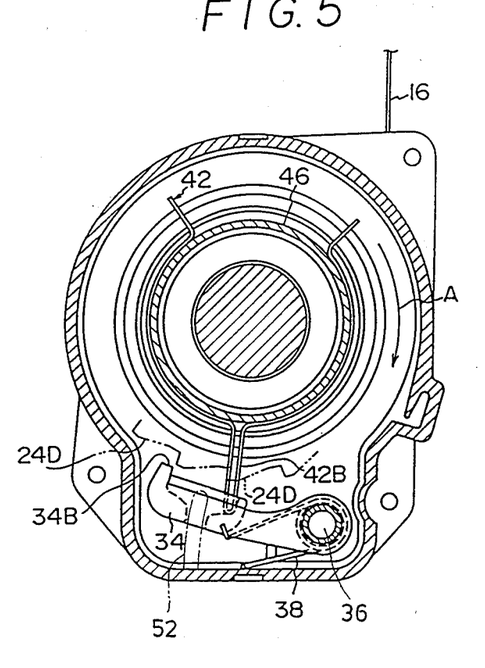
FIGS. 5 and 6 are side views showing operating conditions different from the state shown in FIG. 2.
Figure 6:
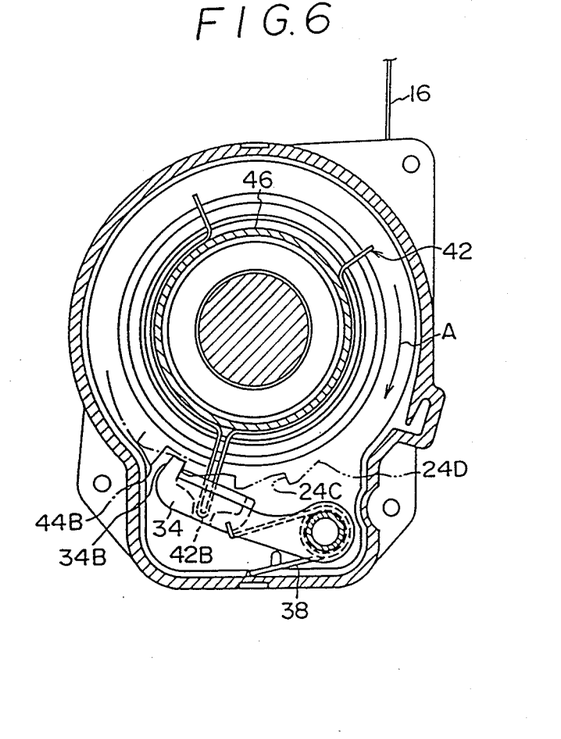

As shown in FIGS. 5 and 6, the groove 48 enables the arm 42B to be rotated up to its abutting position against side walls 48A and 48B. That is, the arm 42B is abutted against the side wall 48A under a rotation of the retracting shaft 14 in a direction of webbing winding operation. The arm 42B is abutted against the side wall 48B under its rotation in a webbing pulling-out direction. Therefore, the rotation of the friction spring 42 is restricted so as to generate a sliding movement between the intermediate portion 42A of the friction spring and the cylindrical portion 46. Under a condition in which the arm 42B is abutted against the side wall 48A, the extremity end of the arm 42B corresponds with the bottom wall 48C of the groove 48 and in turn under a condition in which the arm 42B is abutted against the side wall 48B, the arm corresponds with the bottom wall 48D so as to prevent the pawl 34 from being engaged with the ratchet wheel 24. However, under a condition in which the arm 42B corresponds with the bottom wall 48D, the pawl 34 may be rotated in a clockwise direction as viewed in FIG. 5 only an amount slightly more than that of a condition in which the arm 42B is corresponded with the bottom wall 48C. The depth of the groove 48 is different for each of the bottom walls 48C and 48D in such a manner that the distance from the projection 34B to the outer circumference of the ratchet wheel 24 is the same under both conditions.

As shown in FIG. 10, a recess 48E is formed between the bottom wall 48C and the bottom wall 48D, and the friction spring 42 can be inserted into the recess 48E as shown in FIG. 6. In this case, since the arm 42B does not restrict the rotation of the pawl 34, the projection 34B can be engaged with the ratchet teeth 24B. The bottom wall 48C and the bottom wall 48D are formed with chamfers 48F and 48G at the side portions of recess 48E.

With the pawl 34, a guide rib 52 projecting from the cover 30 and extended in a longitudinal direction around an axis of the shaft 36 corresponds with the opposite surface of the groove 48 so as to prevent any looseness of the pawl 34.

In the friction spring 42, an end portion opposite to the arm 42B of the intermediate portion 42A is an arm 42C projecting in a radial direction of the cylindrical portion 46 so as to hold it when its fixing operation is performed.

Figure 7:
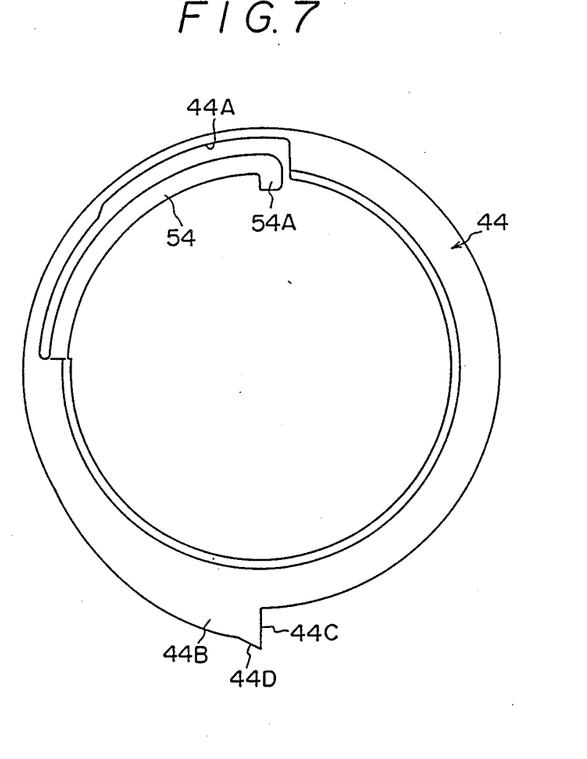
FIG. 7 is a front elevational view showing a cam plate.

The cam plate 44 is a hollow ring shape as shown in FIG. 7. Its side surface is, as shown in FIG. 1, arranged between the friction spring 42 and a flange portion 22C of the connection wheel 22. Its inner circumference is supported at an outer circumference of a large diameter cylinder 46A (see FIG. 8) between the cylindrical portion 46 and a flange portion 22C so as to enable a relative rotation with the connection wheel 22. The cam plate 44 is formed with a recess 44A which extends over approximately ⅓ of its inner circumference and further is formed with a force receiving arm 54 which is integrally projected into the recess 44A. This force receiving arm 54 has its base end connected to one end of the recess 44A and is extended in an arc form along the recess 44A. Its extremity end is a projection 54A which is bent in a radial direction. Projection 54A is inserted into a groove 56 (see FIG. 8) formed at an outer circumference of the large diameter cylinder 46A.

Figure 8:
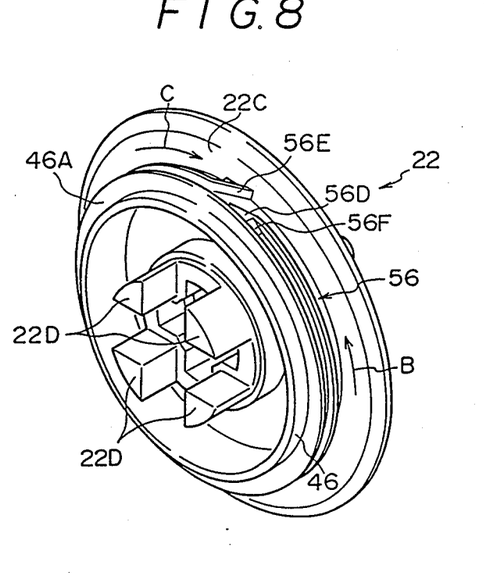
FIG. 8 is a perspective view showing a connection wheel.
Figure 9:
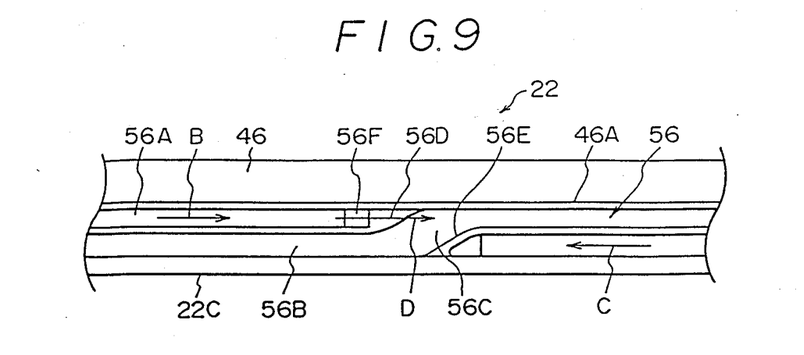
FIG. 9 is a top plan view showing a developed groove shape of a connection wheel.

As shown in FIGS. 8 and 9, this groove 56 is formed at an outer circumference of the connection wheel 22, and has a first groove 56A and a second groove 56B formed in planes perpendicular to the axial direction of the connection wheel 22. The first groove 56A and one end of the second groove 56B communicate by means of a slant groove 56C which is inclined with respect to a plane perpendicular to the axial direction of the connection wheel 22, thereby forming a helical groove of about two turns.

In the preferred embodiment, although the first groove 56A and the second groove 56B are connected by a slant groove 56C to form a substantially helical groove, it may also be possible to have a helical groove, such as a thread, in which the first groove and the second groove are inclined with respect to an axis perpendicular to the plane of the cam plate.

The end portions of the first groove 56 and the second groove 56B form walls 56D and 56E, respectively, where these grooves intersect slant groove 56C. A part of the wall 56D is a slant surface 56F in which a groove depth of the first groove 56A is gradually decreased. Due to this arrangement, when the force receiving arm projection 54A of the cam plate 44 entering into the groove 56 is moved in a direction of an arrow head B as shown in FIG. 9 by the webbing being pulled out, the arm projection may ride over wall 56F, 56D at the end portion of the first groove 56A in a direction of an arrow head D and enter again into the slant groove 56C. The wall 56D is made lower than the large diameter cylinder 46A (see FIG. 8) to enable the force receiving arm projection 54A to be guided positively in a direction of the arrow head D.

The force receiving arm 54 can be resiliently deformed in two directions, a radial direction of FIG. 7, i.e. such as away from the center axis and in a direction parallel to the axial center (a direction perpendicular to the sheet of FIG. 7). Therefore the force receiving projection 54A can move from the first groove 56A to the second groove 56B through the slant groove 56C and can ride over the wall 56D in a direction of the arrow head D in FIG. 9 The arrow head B in FIG. 9 indicates the moving direction of the force receiving arm projection 54A when the webbing is pulled out and an arrow head C indicates the direction arm projection 54A is moving when the webbing is retracted. Four projections 22D shown in FIG. 8 are used for connecting with the retracting shaft 14 of the connection wheel 22.

As shown in FIG. 7, the outer circumferential part of the cam plate 44 has a substantially triangle shaped cam projection 44B at a portion thereof. The cam projection 44B has a vertical wall 44C and a slant wall 44D. Slant wall 44D causes the pawl 34 to be moved away from the ratchet wheel 24 in response to the projection 34B of the pawl 34 contacting the slant wall 44D when the cam plate 44 is in a clockwise direction while being engaged with the ratchet wheel 24 as shown in FIG. 5.

Then, the action of the preferred embodiment of the present invention will be described.

Figure 4:
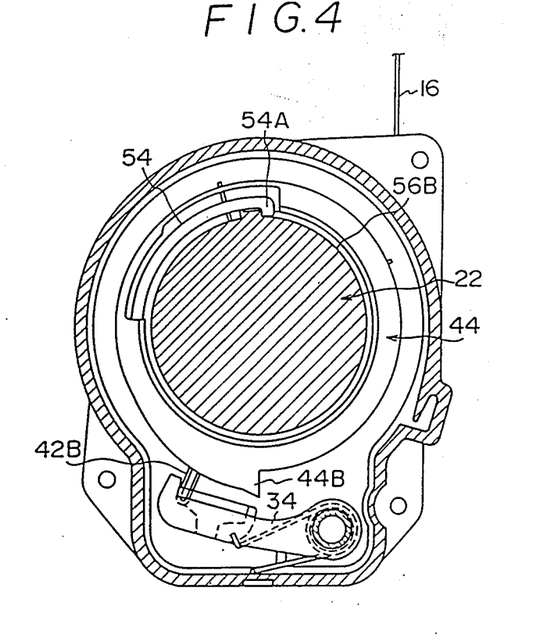
FIG. 4 is a sectional view taken along a line IV—IV of FIG. 1.

FIG. 4 shows a state of the fully wound and stored condition of the webbing 16 when the occupant is not wearing the webbing 16. Under this condition, the arm 42B corresponds to the bottom wall 48C and causes the pawl 34 to be moved away from the ratchet wheel 24. The cam plate 44 is not placed at a specified location.

In order for the occupant to pull out the webbing 16 in a direction opposite to the direction of the arrow head A, the retracting shaft 14 and the connection wheel 22 are rotated in a counterclockwise direction of FIG. 4, so that the friction spring 42 is rotated in a counterclockwise direction while its intermediate portion 42A receives a friction force from the cylindrical portion 46. Due to this fact, the extremity end of the arm 42B corresponds to the recess 48E of the pawl 34. Thus, the pawl 34 has a projection 34B contacting the ratchet wheel 24 though an urging force of the twisted coil spring 38. However, as the webbing 16 continuously receives a tensile force, the projection 34B of the pawl 34 is pushed up over the slant surface 24D of the ratchet wheel 24. At the same time, the friction spring 42 is receiving a rotational force in the counterclockwise direction of FIG. 4 and its arm 42B is moved toward the bottom wall 48D (see FIG. 10). As shown in FIG. 5, the pawl 34 is kept at a state where it is spaced apart from the ratchet wheel 24. In addition, as the webbing 16 is pulled out further, the friction spring 42 has its intermediate portion 42A rotated in respect to the cylindrical portion 46 and the friction spring 42 is stopped while the arm 42B is being abutted against the side wall 48B. The cam plate 44 receives the frictional force in a counterclockwise direction from the connection wheel 22, which is rotated with a low rotational force in a counterclockwise direction, and the vertical wall 44C contacts the projection 34B of the pawl 34 and stops. Due to this arrangement, as the webbing is pulled out, the force receiving cam projection 54A of the cam plate continues to perform a relative movement within the groove of the connection wheel, i.e. the first groove 56A in the directions of arrow heads B and D in FIG. 9.

After the occupant pulls out the webbing 16 sufficiently, and the tongue plate not shown in the drawing is engaged with the buckle device, a surplus amount of pulling-out webbing is wound until it is closely contacted with the occupant by the urging forces of both the small spiral spring 26 and the large spiral spring 28. Due to this fact, the retracting shaft 14 and the connection wheel 22 are rotated in a clockwise direction of FIG. 5 by about one turn.

As the friction spring 42 is rotated through frictional force between it and the cylinder 46, the arm 42B aligns with the recess 48E of the pawl 34 and, as shown in FIG. 6, the pawl 34 is rotated in a clockwise direction under a biasing force of the twisted coil spring 38 and then the projection 34B is engaged with the ratchet wheel 24. Due to this arrangement, the urging force from the large spiral spring 28, is prohibited and acting against the connection wheel 22 and the retracting shaft 14. Only the small spiral spring 26 may apply a weak retracting force to the retracting shaft 14 making a reduced tension state. With this operation, a feeling of compression on the occupant is reduced.

When the webbing 16 is pulled out of the retracting shaft 14 as the occupant changes his driving attitude, the retracting force reduced state is maintained until the small spiral spring 26 is tightly wound. When the webbing 16 is retracted onto the retracting shaft 14 due to a variation of driving attitude or breathing of the occupant, the connection wheel 22 is rotated in a clockwise direction as shown in FIG. 6. However, the projection 54A in the groove 56 of the connection wheel 22 does not accept any rotational force from the connection wheel 22 until it is moved in the direction of the arrow head B in FIG. 9 and abutted against the wall 56D. Although the location of projection 54A in the first groove 56A differs depending on the stopped position of the cam plate 44, the cam projection 44B of the cam plate 44 just after the retracting force is reduced is as shown in FIG. 6. Although it depends on the stopped position of the cam plate 44, the projection 54A of the force receiving arm 54 is arranged somewhere in the first groove 56A. Therefore, retracting shaft 14 can be rotated by a minimum amount of two turns and a maximum amount of about three turns while the webbing 16 is retracted around the occupant, until the cam projection 44B of the cam plate 44 pushes out the pawl 34. Thus, the tension reduced state is not released needlessly by a retracting operation during the time in which the webbing 16 is worn by the occupant.

When the occupant releases the restraining webbing 16, the webbing 16 is wound around the retracting shaft 14 under a weak urging force of the small spiral spring 26. Then, after winding a minimum number of two rotations and a maximum number of about three rotations, the projection 54A of the force receiving arm 54 matches with the wall 56E and, the slant wall 44D of the cam projection 44B pushes projection 34B away from the ratchet wheel 24. This releases ratchet wheel 24 so that it can be rotated and allows the large urging force of the large spiral spring 28 to be applied to the retracting shaft 14. The retracting shaft 14 then winds up the webbing 16 by a strong force to its fully stored condition.

Figure 11:
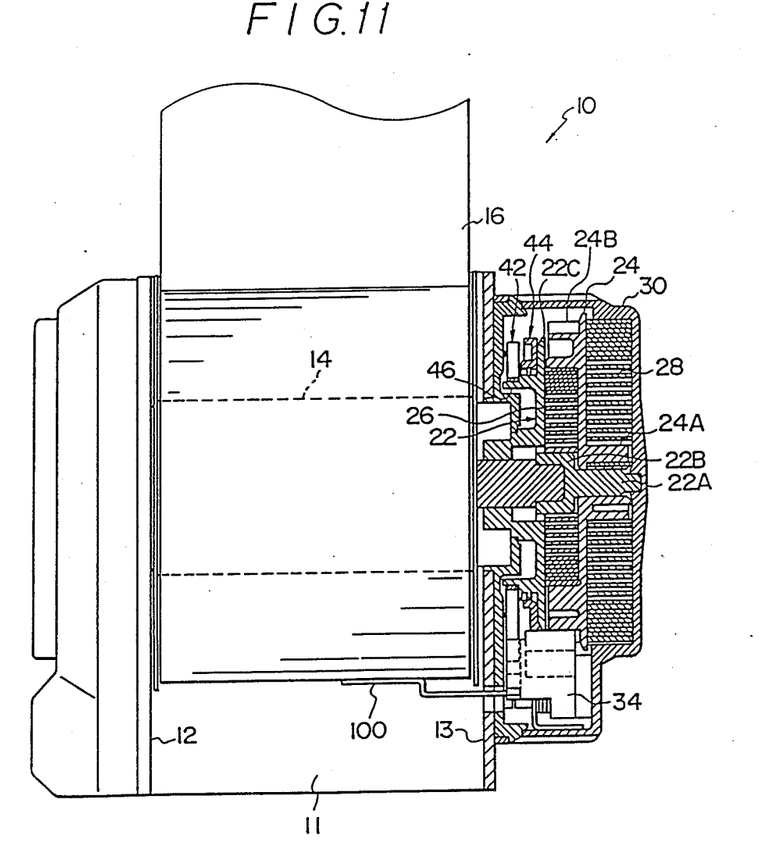
FIG. 11 is a sectional view corresponding to FIG. 1
Figure 12:
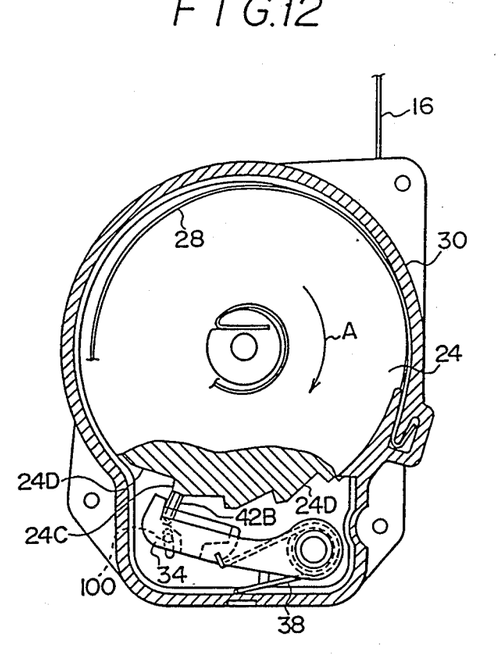
FIG. 12 is a sectional view corresponding to FIG. 2.
Figure 13:
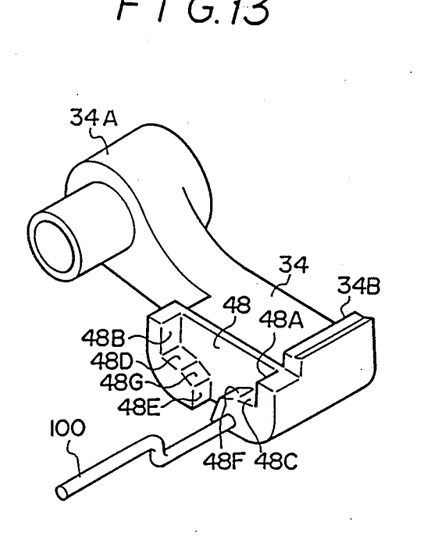
FIG. 13 is a perspective view of a pawl corresponding to FIG. 10.

FIGS. 11 to 13 illustrate a second embodiment, a modified form of the above-described preferred embodiment. In this retractor device 10, a winding diameter sensing lever 100 for sensing a winding diameter of the webbing 16 is fixed to the pawl 34. The base end of the diameter sensing lever 100 is fixed to the extremity end of the pawl 34, its intermediate portion passes through the leg plate 13 of the frame 11, and the extremity end is opposite to the outer-most circumferential layer of the webbing 16 wound around the retracting shaft 14.

The extremity end of the winding diameter sensing lever 100 is made such that when the winding diameter of the webbing 16 is more than a desired intermediate diameter between the occupant restraining condition and the fully-wound condition, it may abut against the outer-most circumferential layer of the webbing 16 wound in a layered form. Under this condition, the pawl 34 may not oscillate toward its biased direction under an influence of the twisted coil spring 38. Even in case that the arm 42B of the friction spring 42 is opposite to the recess 48E of the pawl 34, the pawl 34 may not be engaged with the ratchet wheel 24.

Accordingly, even in the case that the retracting of the webbing at some midway point 16 is temporarily stopped of its retracting operation after the occupant releases the restraining webbing 16 and the retracting of the webbing 16 is started, the retracting urging force of the webbing 16 is not reduced, so that the webbing 16 can be positively retracted up to its fully-wound condition.

Also, even in the case that the pulling-out of the webbing is stopped after the fully-wound webbing 16 is pulled out slightly, the retracting urging force of the webbing 16 is not reduced, so that the webbing 18 can be positively wound up to its fully-wound or retracted condition.

As described above, the present invention is operated such that the projection in the cam apparatus is guided by the helical groove arranged in the connection wheel, so that the present invention has a superior effect in that a range of conditions where the retracting force is reduced is extended and the retracting force reduced condition is not needlessly released during the time when the occupant is restrained by the webbing.

What is claimed is:

1. A webbing retractor comprising a frame; a retracting shaft supported in said frame for winding up an occupant restraining webbing; a connection wheel connected to said retracting shaft; a first resilient member engaged with said connection wheel at one end; a ratchet wheel engaged with the other end of said first resilient member; a second resilient member engaged with said ratchet wheel at one end and engaged with said frame at the other end; a pawl engaged with said ratchet wheel so as to prevent an urging force of said second resilient member from being transmitted to said retracting shaft; a frictional rotating means being rotatable to a desired angle under a transmittance of a rotation of said retracting shaft through a frictional force and enabling said pawl to be engaged with said ratchet wheel under an intermediate state of rotation; cam means provided with a plurality of projections, said cam means being rotatable under a rotational force of said connection wheel to move said pawl away from said ratchet wheel when rotated in a webbing retracting direction; and cam driving means defined by a groove formed helically at an outer circumference of said connection wheel for receiving a first projection projected from said cam means, whereby a rotation of said connection wheel is transmitted to said cam means when said first projection contacts a longitudinal end of said groove.

2. A webbing retractor according to claim 1, wherein said pawl is provided with a restricting means for restricting a rotational angle of said frictional rotating means to said desired angle.

3. A webbing retractor according to claim 2, wherein said frictional rotating means has a rotation transmitting portion where a rotation of said retracting shaft is transmitted through a frictional force and an abutting portion abutted against said pawl to prevent said pawl from engaging with said ratchet wheel.

4. A webbing retractor according to claim 3, wherein said pawl is formed with a recess for storing said abutting portion, and said restricting means is comprised of a pair of side walls forming a portion of said recess abutting against the side surface of said abutting portion to restrict a rotation of said frictional rotating means.

5. A webbing retractor according to claim 4, wherein the bottom wall portion of said recess constitutes an engagement preventing means in which an extremity end of said abutting portion of said frictional rotating means is abutted to prevent an engagement between said pawl and said ratchet wheel.

6. A webbing retractor according to claim 5, wherein said bottom wall portion is formed with a recess portion one part of which is cut and this cut part stores the extremity end of said abutting portion to enable said engagement of said pawl with said ratchet wheel to be performed.

7. A webbing retractor according to claim 1, wherein said groove is provided with a plurality of first grooves formed in planes perpendicular to an axial direction of said connection wheel and a second groove communicating with said first grooves and formed at an angle to said perpendicular plane.

8. A webbing contractor according to claim 1, wherein said grooves are composed of grooves which are inclined with respect to the plane perpendicular to the axial direction of said connection wheel.

9. A webbing retractor according to claim 1, wherein said cam means comprises a second projection projecting from an outer circumference part of an annular plate supported by said connection wheel for disengaging said engagement of said pawl with said ratchet wheel.

10. A webbing retractor according to claim 9, wherein said first projection is radially projected from an inner circumference part of said annular plate.

11. A webbing retractor according to claim 1, wherein said frictional rotating means is composed of a leaf spring member.

12. A webbing retractor according to claim 1, further comprising an engagement preventing means for preventing said pawl from being engaged with said ratchet wheel when the amount of winding of said webbing around said retracting shaft exceeds a desired amount.

13. A webbing retractor according to claim 12, wherein said engagement preventing means is comprised of a lever abutting against an outer-most circumferential layer of said webbing, one end of which is supported by said pawl and the other end of which is supported by said webbing wound around said retracting shaft.

14. A webbing contractor comprising a frame to be fixed to a chassis; a retracting shaft supported by said frame to wind up an occupant restraining webbing at an outer circumference thereof; a connection wheel fixed to one end part of said retracting shaft; a first resilient member having one end engaged with said connection wheel; a ratchet wheel axially supported to said connection wheel and engaged with the other end of said first resilient member; a second resilient member engaged with said ratchet wheel at one end and supported by said frame at the other end, and having a larger urging force than that of said first resilient member; a pawl engaged with said ratchet wheel to prevent said urging force of said second resilient member from being added to said retracting shaft; a frictional rotating means supported at an outer circumference of said connection wheel, and being rotatable through transmission of a frictional force to a desired angle and for enabling said pawl to be engaged with said ratchet wheel under an intermediate condition of rotation; cam means supported at an outer circumference of said connection wheel, and rotated by a transmitted rotational force of said connection wheel and moving said pawl away from said ratchet wheel during rotation in a webbing retracting direction; and cam driving means defined by a groove formed helically at an outer circumference of said connection wheel for receiving a projection projecting from said cam means, whereby a rotation of said connection wheel is transmitted to said cam means when said projection contacts a longitudinal end of said groove.

15. A webbing retractor according to claim 14, wherein said groove is provided with a plurality of first grooves formed in planes perpendicular to an axial direction of said connection wheel and second grooves communicating with said first grooves and formed at an angle to said perpendicular plane.

16. A webbing retractor according to claim 14, wherein said grooves are composed of grooves which are inclined in respect to the plane perpendicular to the axial direction of said connection wheel.

17. A webbing retractor according to claim 14, wherein said pawl is provided with a restricting means for restricting a rotational angle of said frictional rotating means to said desired angle.

18. A webbing retractor according to claim 17, wherein said frictional rotating means is comprised of a leaf spring member and has a rotation transmitting portion for transmitting a rotation of said connection wheel through a frictional force and an abutting portion abutted against said pawl to prevent said pawl from engaging with said ratchet wheel.

19. A webbing retractor according to claim 18, wherein said pawl is formed with a recess for storing said abutting portion and said restricting means is comprised of a pair of side walls forming a portion of said recess abutting against a side surface of said abutting portion to restrict a rotation of said frictional rotating means.

20. A webbing retractor according to claim 19, wherein a bottom wall of said recess portion constitutes an engagement preventing portion in which an extremity end of said abutting portion is abutted to prevent an engagement between said pawl and said ratchet wheel, said bottom wall part being formed with a recess one portion of which is recessed, and said recess stores said extremity end of said abutting portion to enable said engagement of said pawl with said ratchet wheel to be performed.

* * * * *